(12) United States Patent
Lambertini

(10) Patent No.: US 6,478,129 B2
(45) Date of Patent: Nov. 12, 2002

(54) CENTRIFUGAL CLUTCH

(75) Inventor: Franco Lambertini, Bazzano (IT)

(73) Assignee: Morini Franco Motori S.p.A., Bologna (IT)

( * ) Notice: Subject to any disclaimer, the term of this patent is extended or adjusted under 35 U.S.C. 154(b) by 22 days.

(21) Appl. No.: 09/825,307

(22) Filed: Apr. 4, 2001

(65) Prior Publication Data

US 2001/0054534 A1 Dec. 27, 2001

(30) Foreign Application Priority Data

Jun. 26, 2000 (EP) ............................................ 00830443

(51) Int. Cl.7 ................................................ F16D 43/18
(52) U.S. Cl. ........................... 192/105 CD; 192/110 R; 192/103 B
(58) Field of Search ...................... 192/105 CD, 110 R, 192/103 B, 105 R

(56) References Cited

U.S. PATENT DOCUMENTS

| | | | |
|---|---|---|---|
| 1,692,703 A | | 11/1928 | Ricolage |
| 1,726,562 A | * | 9/1929 | Hoerl .................. 192/105 CE |
| 2,011,427 A | * | 8/1935 | Tranaas .................. 192/109 R |
| 2,355,710 A | | 8/1944 | Dodge |
| 3,561,516 A | | 2/1971 | Reddy |
| 4,013,156 A | | 3/1977 | Milosevic |
| 4,106,605 A | * | 8/1978 | Winchell ............. 192/105 CD |
| 4,976,065 A | * | 12/1990 | Beran et al. .......... 192/105 CD |
| 5,165,510 A | * | 11/1992 | Lunati .................... 192/103 B |
| 5,503,261 A | * | 4/1996 | Schultz ................... 192/103 B |

FOREIGN PATENT DOCUMENTS

WO   WO 00/39476   7/2000

* cited by examiner

*Primary Examiner*—Saul Rodriguez
(74) *Attorney, Agent, or Firm*—Young & Thompson

(57) ABSTRACT

A centrifugal clutch comprises centrifugal masses (3) pivoted on a first surface (2a) of a first support disk (2) having an axis of rotation (X); each mass (4) is provided with a friction pad (8) which, during rotation, by effect of the centrifugal force, comes in contact with the inner wall (9a) of an external drum (9) coaxial to the support disk (2); the centrifugal clutch further comprises a group (30) for returning said centrifugal masses (3) connected to said support disk (2), the group (30) include at least one elastic element (12), at least one motion transferring element (15) acting between each centrifugal mass (3) and the corresponding elastic element (12), and an adjusting element (14), operable and positioned in a substantially parallel manner to the axis (X) of rotation of the support disk (2), for varying pre-load of the elastic element (12).

16 Claims, 5 Drawing Sheets

CENTRIFUGAL CLUTCH

BACKGROUND OF THE INVENTION

1. Field of the Invention

The present invention relates to a centrifugal clutch, in particular for motor vehicles.

2. Background Art

Clutches of this kind comprise a drum connected to a driven shaft and masses positioned free to move on a support disk connected to the drive shaft which, under the effect of the centrifugal force, transmit to the driven side of the clutch a given torque due to the contact force of a friction pad, mounted on the masses themselves, against the inner wall of the drum.

The masses are generally mounted by means of pins parallel to the axis of rotation of the disk, uniformly distanced on the disk itself.

When the disk is made to rotate, the masses rotate outwards under the effect of the centrifugal force, whilst the pads described a radial motion towards the inner wall of the drum, opposing a return force generally exerted by a helical screw. Beyond a certain rotating speed, the centrifugal force exceeds the aforesaid return force by a value equal to the force which the pads have to exert against the drum to transmit the rotation thereto.

In motor vehicles, and in particular in those designed for competitions, it is very important to determine the "stall" and "coupling" rpm (revolution per minute) of the clutch.

Stall rpm is the number of revolutions of the engine in which, when the vehicle is stopped (brakes on), the torque transmitted by the clutch is in equilibrium with the one delivered by the engine.

Coupling rpm is the number of revolutions of the engine in correspondence with which the masses, expanding radially, start to come in contact with the inner wall of the drum.

There is also a transient from the start of the slipping when the masses actually connect with the wall of the drum until the number of revolutions of the clutch equals the number of revolutions of the engine.

The type of centrifugal clutch described above has some drawbacks.

In clutches of this kind, the stall and coupling speeds depend not only on the centrifugal masses, but also on the characteristics of the return spring. Therefore, if the stall and coupling speed are to be changed, normally it is opportune to change the return springs.

To make this change, it is necessary completely to disassemble the clutch, so as to replace the existing springs with springs having different elastic characteristics.

SUMMARY OF THE INVENTION

The aim of the present invention is to obtain an enhanced centrifugal clutch in which the stall and coupling regimes can easily be changed.

In accordance with an aspect of the present invention, a centrifugal clutch is presented as specified in claim 1.

The dependent claims refer to preferred and advantageous embodiments of the invention.

BRIEF DESCRIPTION OF THE DRAWINGS

Embodiments of the present invention, purely by way of non limiting example, are described hereafter with the aid of the accompanying drawings, which.

DESCRIPTION OF THE PREFERRED EMBODIMENTS.

In accordance with the figures of the accompanying drawings, the reference number 1 indicates the centrifugal clutch of the present invention.

Figure 1:
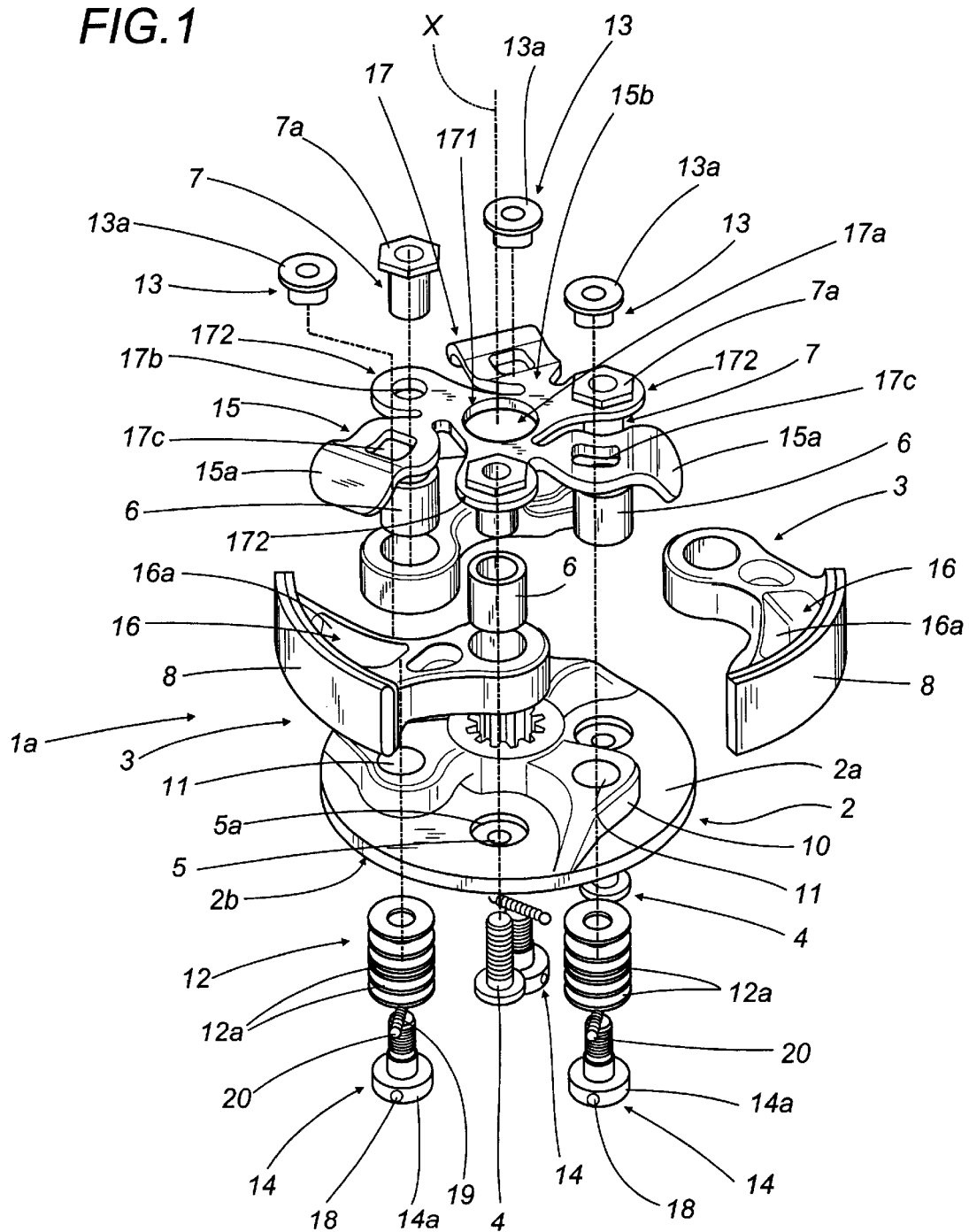
FIG. 1 shows the components of the subject device in a perspective view.

FIG. 1 shows the components of the engine side 1a of the centrifugal clutch. The clutch 1 presents a support disk 2 which can be connected to a drive shaft, not shown in the figures, rotating about an axis X.

The disk 2 has a first surface 2a whereon are pivoted centrifugal masses 3 (in the illustrated case, there are three masses) by means of pins or screws 4, parallel to the axis X, able to be inserted in a first series of holes 5 on the second surface 2b of the disk 2.

Each hole 5 presents, in correspondence with the surface 2a, a coaxial seat 5a of greater diameter into which a bushing 6 is partially inserted. The bushing 6 assures a rotating motion of the masses 3 relative to the screws 4.

The screws 4 are connected to corresponding hollow cylindrical elements 7, internally threaded, able to be inserted into the bushing 6, which present at an end a head 7a able to allow the axial fastening of the centrifugal masses 3.

Each centrifugal mass 3 is provided with a friction pad 8, having arched profile, which is thrust towards an external drum 9 (shown in FIG. 7) to transmit motion by means of friction.

The clutch comprises means 30 for returning the centrifugal masses 3, connected to the support disk 2.

Figure 4:
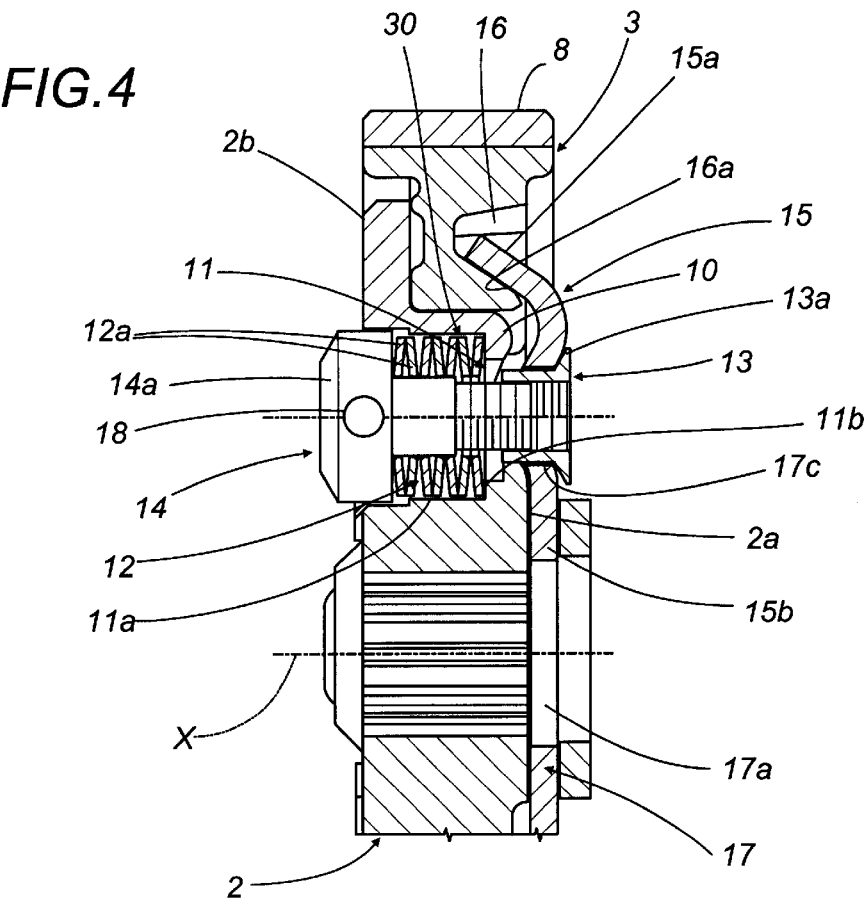
FIG. 4 shows a first embodiment of the subject device in a section according to the line IV—IV of FIG. 2.

In the clutch 1 of the present invention, the return means 30 comprise, in correspondence with each centrifugal mass 3, an elastic element 12 inserted on the second surface 2b in second holes 11 (FIG. 4).

The elastic element 12 can be constituted by a helical spring 12b (FIG. 9) or by a plurality of Belleville washers 12a.

The use of Belleville washers is advantageous because they are highly compact and they are less affected by the stresses due to the centrifugal force.

The Belleville washers 12a are inserted in appropriate cylindrical seats 11a coaxial to the holes 11 and obtained in projections 10 situated on the first surface 2a of the disk 2. The washers 12a are in contact against the bottom 11b of the seat 1a (FIG. 4).

On the second surface 2b of the disk 2, inside each hole 11 is inserted a fastening element, for instance a screw, whose head 14a is able to come in contact In with the washers 12a.

On the first surface 2a of the disk 2, inside each hole 11 is inserted an internally threaded nut 13, connected to the corresponding screw 14 and externally presenting an oscillating contact surface 13a.

In the centrifugal clutch 1 according to the invention the return means 30 further comprise motion transferring means or levers 15.

In the embodiment shown in the figures, such elements for transferring motions or levers 15 are planar and substantially parallel to the first surface 2a of the disk 2, and present an end 15a inclined towards the first surface 2a itself in such a way as to be engaged in recesses 16 obtained in the centrifugal masses 3.

In the embodiment illustrated in FIG. 4, each lever 15 presents, in proximity to the axis of rotation X, a lesser section 15b serving as a hinge in such a way as to be able to flex according to the load applied to the spring 12a.

Figure 5:
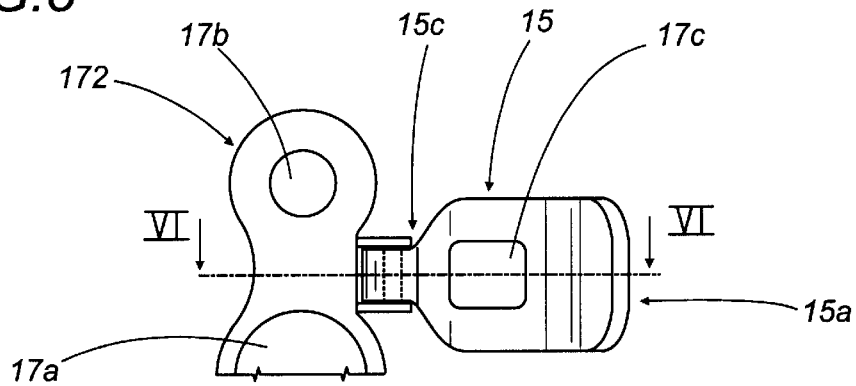
FIG. 5 shows a variation of the embodiment of FIG. 2 in a bottom view.
Figure 6:
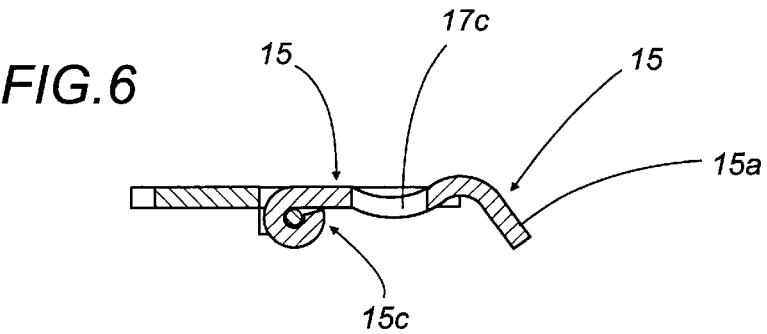
FIG. 6 shows the variation of FIG. 5 in a section according to the line VI—VI.

In the embodiment shown in FIG. 5 and 6, the lever 15 presents, in proximity to the axis of rotation X, a mechanical articulated joint 15c.

Figure 3:
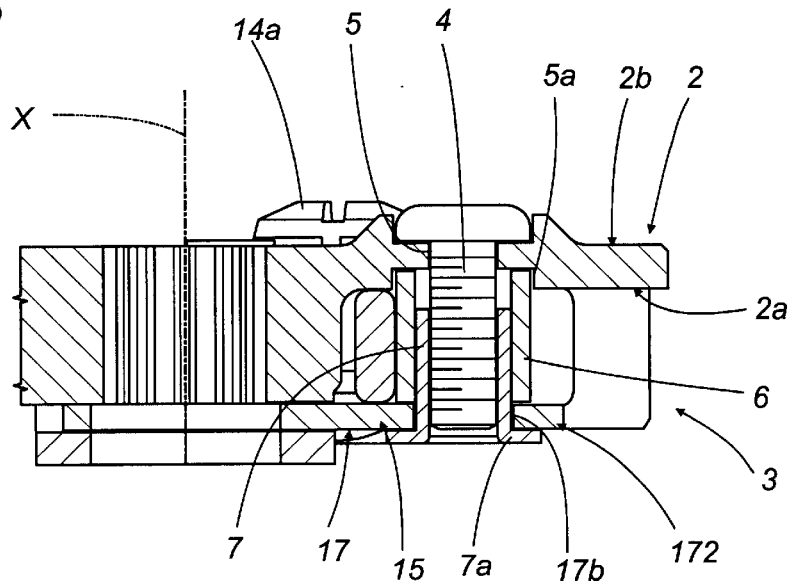
FIG. 3 shows the subject device in a section according to the line III—III of FIG. 2.

Advantageously, in the embodiment shown in FIGS. 3 and 4, the levers 15 are obtained in a single appropriately shaped plate 17 presenting a central hole 17a for the passage of the drive shaft, first holes 17b for fastening to the disk 2 by means of the screws 4 and second holes 17c for connection with the washers 12a.

The second holes 17c are obtained in correspondence with the levers 15, allowing the connection of the levers 15 to the corresponding washers 12a through the nut 13.

Figure 2:
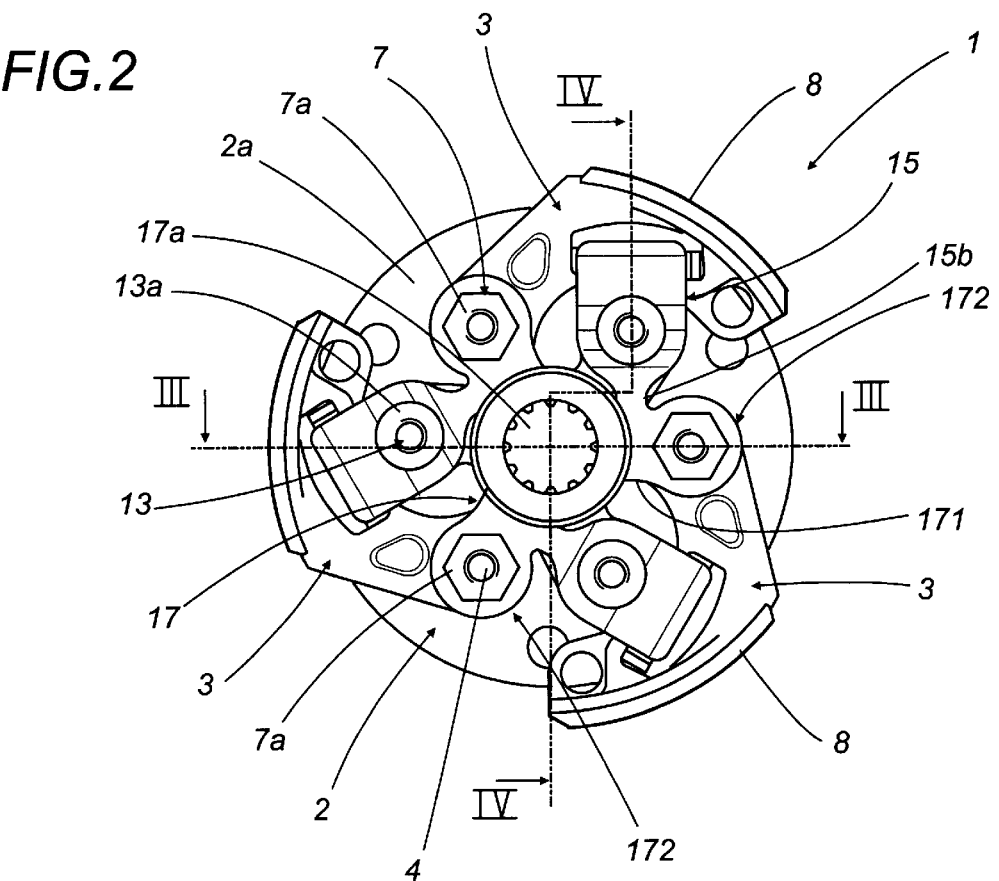
FIG. 2 shows the subject device in a view from the internal side of the engine.

FIG. 2 shows the plate 17 superposed to the masses 3 and fastened by means of the projections 7a of the cylindrical elements 7 and of the contact surfaces 13a of the nuts 13.

As the Figure shows, the plate 17 presents a holed central portion 171 to allow the passage of the drive shaft.

From the central portion 171, substantially circular planar portions 172, presenting the first holes 17b for the insertion of the screws 4 and of the corresponding cylindrical elements 7, extend in radial direction.

From the central portion 171 develop the levers 15, in a direction substantially orthogonal to the extension whereon lie the circular portions 172.

The levers 15 present, in correspondence with the connection with the central portion 171, the lesser section 15b which allows the flexion of the motion transferring element 15.

FIG. 3 shows the connection of the centrifugal mass 3 to the support disk 2 by means of the screws 4 and the radial cylindrical elements 7 with the insertion of the bushing 6.

FIG. 4 shows the connection of the plate 17, and in particular of the levers 15, to the support disk 2 and to the centrifugal masses 3.

The screw 14 is inserted on the second surface 2b of the disk 2, inside each hole 11, in such a way that the head 14a comes in contact with the Belleville washers 12a.

On the first surface 2a of the disk 2, inside each hole 11 is inserted the nut 13. The nut 13 (see FIG. 1) presents a threaded internal surface for connection with the screw 14 and a substantially square external surface, able to be inserted into the holes 17c obtained in the lever 15, which present a substantially rectangular profile. This design prevents the rotation of the nut 13 during the tightening of the screw 14, whilst allowing a certain displacement of the nut 13 in radial direction.

Moreover, the oscillating contact surface 13a of the nut 13 is conical or spherical, in order to allow a certain rotation of the nut 13 itself relative to the lever 15 due to the displacement, in a direction parallel to the axis X, of the end 15a of the lever 15 as illustrated hereafter.

As shown in FIG. 4, the recess 16 obtained in each mass 3 presents an inclined surface 16a which is coupled to the inclined end 15a of the lever 15.

When the masses 3 move in the radial direction by effect of the centrifugal force, the inclined end 15a of the lever 15 slides on the inclined surface 16a of the recess 16 moving in a direction parallel to the axis of rotation X and thus flexing and rotating in correspondence with the lesser section 15b.

This rotation causes a translation in the direction substantially parallel to the axis X of the nut 13 and hence of the screw 14 which compresses the washers 12a.

The lever 15 thus realises a lever of the second type in which the section 15b constitutes the hinge, in the end 15a is applied the force due to the centrifugal masses 3 and in the intermediate part in which the hole 17c is situated, the force of the washers 12a is applied.

It should be noted that the lever 15, in addition to serving the function of transferring motion, also contributes to the elastic function of the spring 12a. The section 15b, working by flexing, determines an elastic return effect of the centrifugal masses 3.

The illustrated embodiment allows to vary pre-loading on the washers 12a and hence to increase or decrease the return force acting on the centrifugal masses 3 depending on the coupling and stall engine rpm to be obtained.

Acting on the screws 14, one increases compression on the washers 12a and the tightening force exerted on the lever 15.

The lever 14 further presents a fine pitch thread to enhance adjustment precision. This is particular advantageous with the use of Belleville washers because their force/displacement characteristic is very steep, so that for small axial displacements of the screw one has a significant increase in elastic force.

Essentially, if the clutch is to be coupled at a lower engine rpm, it is necessary to act on the screw 14 in order to decrease the tightening force and consequently the compression of the washers 12a. The centrifugal masses 3 reach first the drum 9 transferring the driving force at a lesser engine rpm because the centrifugal force exceeds the return force of the washers 12a earlier.

If instead a higher coupling and stalling rpm is required, it is necessary to increase pre-loading of the washers 12a.

The clutch can therefore be adjusted without disassembling the different parts constituting the clutch itself, since it is sufficient to act on the screw 14 external to the disk 2.

Moreover, in the clutch of the present invention, means 31 are provided for setting the washers 12a.

Figure 7:
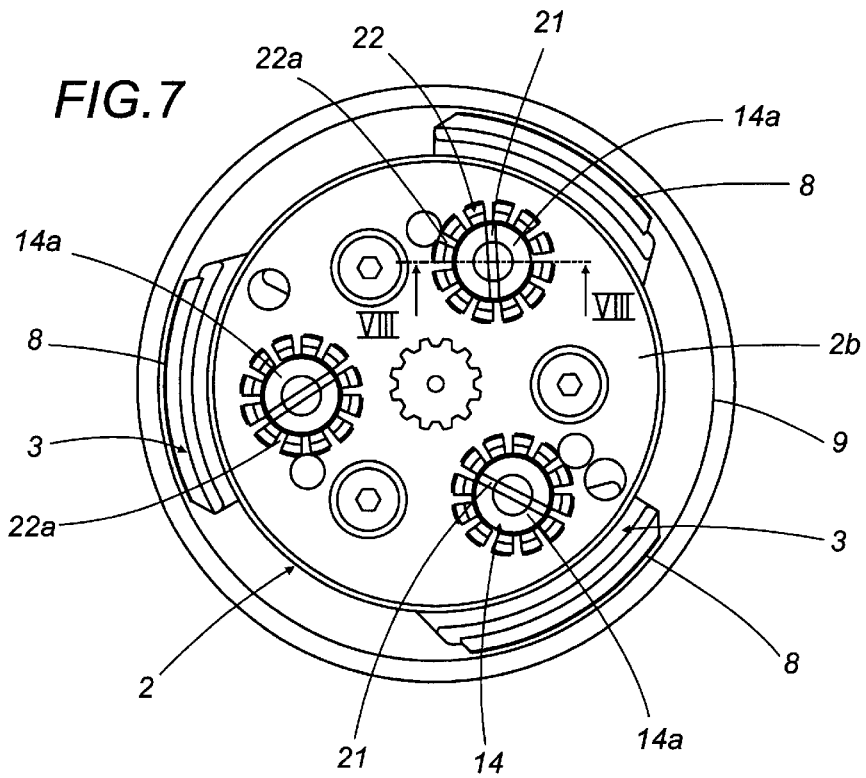
FIG. 7 shows the subject device in a view from the external side of the engine.
Figure 8:
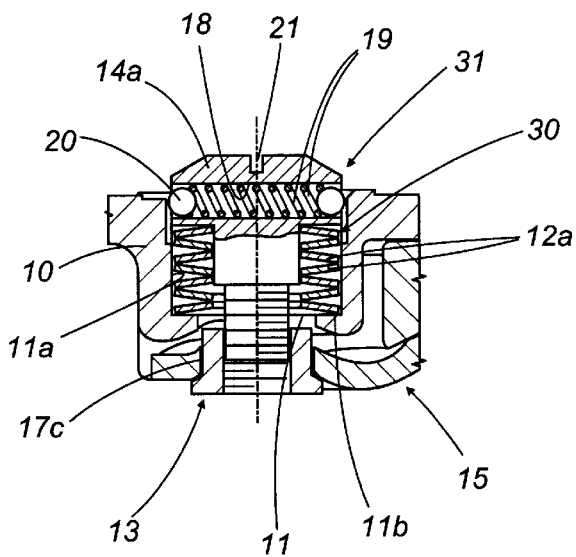
FIG. 8 shows a first embodiment of the subject device in a section according to the line VIII—VIII of FIG. 7.
Figure 9:
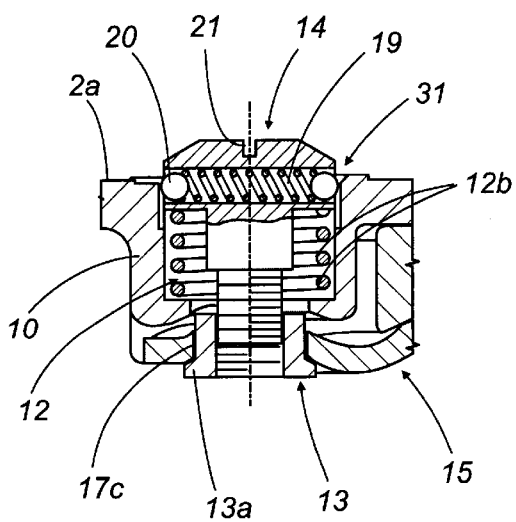
FIG. 9 shows a variation of the embodiment of FIG. 8.

As shown in FIGS. 7, 8 and 9, the setting means 31 comprise a helical spring 19 inserted in a transverse hole 18 obtained in the head of the screw 14.

The helical spring 19 is provided with two small balls 20 at its ends, whilst in the external part of the head of the screw 14 an indentation 21 is obtained (FIGS. 8 and 9).

The second surface 2b of the disk 2 presents, in correspondence with the circumference of each second hole 11 into which the screw 14 is inserted, a ring 22 whereon notches 22a are obtained into which the small balls 20 are inserted (FIG. 7).

Rotating the head of the screw 14 by means of the indentation 21 in such a way as to position the balls 20 in correspondence with the notches 22a of the ring 22, it is possible precisely to determine the pre-loading of the washers 12a always acting externally to the clutch.

Figure 10:
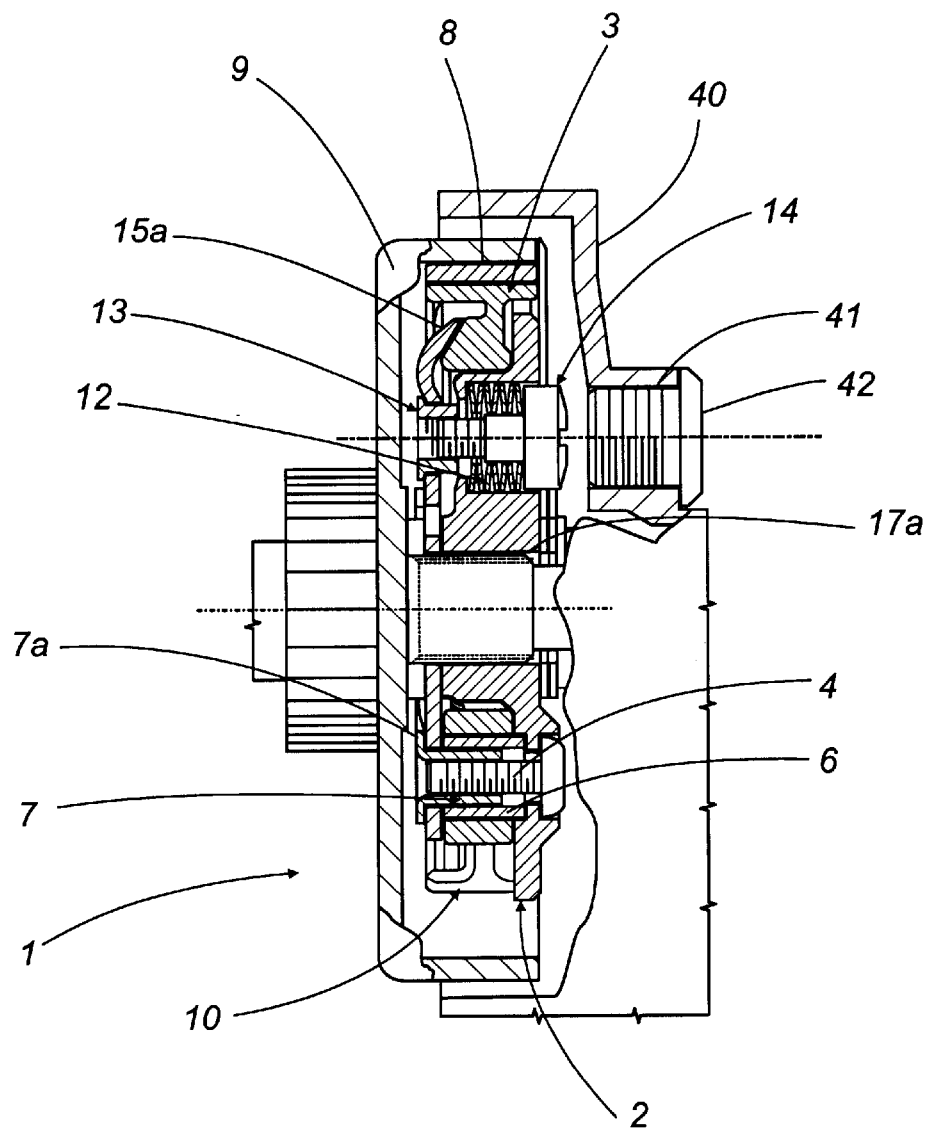
FIG. 10 shows the subject device connected to the engine in a longitudinal section view.

FIG. 10 shows the connection of the clutch 1 to the engine. On the external side of the clutch is located a cover 40 of the clutch provided with at least a hole 41 so positioned that, when the clutch is rotated, the hole 41 is on each occasion coaxial relative to each of the screws 14 which allow to adjust the clutch itself.

A different marking can be provided for each of the positions of the screws 14, in order to select and distinguish which screw is to be adjusted.

The hole 41 is closed by a plug element 42 which can be removed to adjust the clutch. By extracting the plug 42 it is possible to access from the exterior, without disassembling the cover 40, to the head of the screw 14 and to the related indentation 21, thereby tightening the screw 14 and obtaining the corresponding compression on the Belleville washers 12a.

The possibility of tightening the screw from the exterior is particularly advantageous in the sporting applications of the present invention because it allows rapidly to intervene on the adjustment of the clutch.

To calibrate the springs 12a, 12b (in the case of the Belleville washers 12a, regardless of machining tolerances), it is necessary to proceed as follows: each adjusting screw 14 is screwed until the set of the washers 12a is in contact on the bottom 11b of the seat 11a and with the head of the screw 14 itself, but with the washers 12a exerting no force. The screws 14 are then screwed according to a mutually equal angle, i.e. by a few turns or fractions of turn, taking the notches 22a as references.

Since to a certain rotation of the screw 14 corresponds a certain advance of the screw 14 itself due to its own pitch, to equal rotations of the screws 14 correspond equal advances of all the screws 14 of the clutch 1, and hence an equal pre-loading of the washers 12a is guaranteed.

The clutch according to the present invention can therefore be adjusted without requiring to disassemble the components to vary the pre-loading of the screws in such a way as to modify the coupling and stall rpm.

The adjustment can also be effected with particular precision thanks to the system of marked notches obtained on the surface of the support disk, which, together with the indentation with which the head of the tightening screw is provided, serve as references for the number of total or partial rotations which are effected on the screw itself.

The clutch according to the present invention allows easily to conduct the adjustment acting from the exterior, thus avoiding the disassembly of the various components.

What is claimed is:

1. A centrifugal clutch comprising:
    a support disk (2), operatively associated with a drive shaft, having a first surface (2a) and a second surface (2b);
    at least one centrifugal mass (3) pivoted on the first surface (2a) of the support disk (2) having an axis of rotation (X), said mass (3) being provided with a friction pad (8);
    an external drum (9), operatively associated with a driven shaft, coaxial to the support disk (2) and having an inner wall (9a) against which the friction pad (8) comes in contact by effect of the centrifugal force;
    means (30) for returning said centrifugal mass (3) connected to said support disk (2); and
    means (14) for adjusting the returning means (3) being positioned and operable in a substantially parallel manner to the axis (X) of rotation of the support disk (2).

2. A centrifugal clutch as claimed in claim 1, wherein said return means (30) include at least an elastic element (12).

3. A centrifugal clutch as claimed in claim 1, wherein said return means (30) include a plurality of Belleville washers (12a).

4. A centrifugal clutch as claimed in claim 1, wherein said return means (30) include a helical spring (12b).

5. A centrifugal clutch comprising:
    a support disk (2), operatively associated with a drive shaft, having a first surface (2a) a second surface (2b) and a seat (11a);
    at least one centrifugal mass (3) pivoted on the first surface (2a) of the support disk (2) having an axis of rotation (X), said mass (3) being provided with a friction pad (8);
    an external drum (9), operatively associated with a driven shaft, coaxial to the support disk (2) and having an inner wall (9a) against which the friction pad (8) comes in contact by effect of the centrifugal force;
    means (30) for returning said centrifugal mass (3), connected to said support disk (2), including:
        an elastic element (12), having two ends, positioned within the seat (11a) and a first end supported by a bottom (11b) of the seat (11a);
        at least one motion transferring element (15) acting between each centrifugal mass (3) and the corresponding elastic element (12); and
        at least one adjusting element (14) acting on the second end of the elastic element (12), for varying pre-load of the elastic element (12), the adjusting element (14) being positioned and operable in a substantially parallel manner to the axis (X) of rotation of the support disk (2).

6. A centrifugal clutch as claimed in claim 5, wherein said centrifugal mass (3) presents at least a recess (16) inside which is associated an end (15a) of the corresponding motion transferring element (15).

7. A centrifugal clutch as claimed in claim 5, wherein the motion transferring element (15) include an inclined end (15a) mating with a corresponding inclined surface (16a) of the recess (16).

8. A centrifugal clutch as claimed in claim 5, wherein said motion transferring element (5) is planar and substantially parallel to the first surface (2a) of the support disk (2).

9. A centrifugal clutch as claimed in claim 5, wherein said motion transferring element (15) is connected to the support disk (2) by means of flexible connection.

10. A centrifugal clutch as claimed in claim 5, wherein said motion transferring element (15) is connected to the support disk (2) by means of a mechanical articulated joint (15c).

11. A centrifugal clutch as claimed in claim 5, wherein said motion transferring element (15) presents a hole (17c) into which is inserted a nut (13), provided with an external oscillating contact surface (13a), able to be connected to the adjusting element (14), in such a way as to connect said motion transferring element (15) to the support disk (2).

12. A centrifugal clutch as claimed in claim 5, wherein each motion transferring element (15) is connected with flexible connection to a plate (17) provided with holes (17a, 17b) in correspondence with the axis of rotation (X) of the support disk (2) and of the fulcrum of the centrifugal masses (3).

13. A centrifugal clutch as claimed in claim 5, wherein each motion transferring element (15) is connected with flexible connection to a plate (17) having holes (17a, 17b) in correspondence with the axis of rotation (X) of the support disk (2) and of the fulcrum of the centrifugal masses (3) and a hole (17c) for connecting the plate (17) with the support disk (2).

14. A centrifugal clutch comprising:
- a support disk (2), operatively associated with a drive shaft, having a first surface (2a) a second surface (2b) and a seat (11a);
- at least one centrifugal mass (3) pivoted on the first surface (2a) of the support disk (2) having an axis of rotation (X), said mass (3) being provided with a friction pad (8);
- an external drum (9), operatively associated with a driven shaft, coaxial to the support disk (2) and having an inner wall (9a) against which the friction pad (8) comes in contact by effect of the centrifugal force;
- means (30) for returning said centrifugal mass (3) connected to said support disk (2), including:
  - an elastic element (12), having two ends, positioned within the seat (11a) and a first end supported by a bottom (11b) of the seat (11a);
  - an adjusting element (14) acting on the second end of the elastic element (12), for varying pre-load of the elastic element (12), said adjusting element (14) being operable and being positioned in a substantially parallel manner to the axis (X) of rotation of the support disk (2);
  - at least one motion transferring element (15) for transferring motion between the at least one centrifugal mass (3) and the corresponding elastic element (12);
  - a plate (17) having a hole (17c) for connecting the plate (17) with the support disk (2) and connected to the at least one motion transferring element (15), wherein said plate (17) has a central portion (171) and at least two substantially circular planar portions (172), extending from the central portion (171) in radial direction, each motion transferring element (15) extending from said central portion (171) in a direction substantially orthogonal to said circular portions (171).

15. A centrifugal clutch comprising:
- a support disk (2), operatively associated with a drive shaft, having a first surface (2a) a second surface (2b) and a seat (11a);
- at least one centrifugal mass (3) pivoted on the first surface (2a) of the support disk (2) having an axis of rotation (X), said mass (3) being provided with a friction pad (8);
- an external drum (9), operatively associated with a driven shaft, coaxial to the support disk (2) and having an inner wall (9a) against which the friction pad (8) comes in contact by effect of the centrifugal force;
- means (30) for returning said centrifugal mass (3) connected to said support disk (2), including:
  - an elastic element (12), having two ends, positioned within the seat (11a) and a first end supported by a bottom (11b) of the seat (11a);
  - at least one motion transferring element (15) for transferring motion between the at least one centrifugal mass (3) and the corresponding elastic element (12);
  - a plate (17) having a hole (17c) for connecting the plate (17) with the support disk (2) and a central portion (171) and at least two substantially circular planar portions (172), extending from the central portion (171) in radial direction, the at least one motion transferring element (15) being connected to the plate (17) and extending from said central portion (171) in a direction substantially orthogonal to said circular portions (171);
  - an adjusting element (14) acting on the second end of the elastic element (12), for varying pre-load of the elastic element (12), said adjusting element (14) being operable and being positioned in a substantially parallel manner to the axis (X) of rotation of the support disk (2); and
  - means (31) for setting the elastic element (12).

16. A centrifugal clutch as claimed in claim 15, wherein said setting means (31) include a spring (19), able to be inserted in a transverse hole (18) obtained in the end of the adjusting element (14), said spring (19) being provided in correspondence with its ends with substantially spherical elements (20) able to engage in notches (22a) obtained on the second surface (2b) of the support disk (2).

* * * * *